(12) United States Patent
Kito et al.

(10) Patent No.: US 10,717,827 B2
(45) Date of Patent: Jul. 21, 2020

(54) THERMOPLASTIC RESIN COMPOSITION, PRODUCTION METHOD THEREFOR, AND MOLDED BODY

(71) Applicant: TOYOTA BOSHOKU KABUSHIKI KAISHA, Aichi (JP)

(72) Inventors: Masayuki Kito, Aichi (JP); Goro Takahashi, Aichi (JP); Toshihiro Suzuki, Aichi (JP); Mitsutaka Sako, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/087,323

(22) PCT Filed: Mar. 15, 2017

(86) PCT No.: PCT/JP2017/010534
§ 371 (c)(1),
(2) Date: Sep. 21, 2018

(87) PCT Pub. No.: WO2017/169814
PCT Pub. Date: Oct. 5, 2017

(65) Prior Publication Data
US 2019/0092908 A1 Mar. 28, 2019

(30) Foreign Application Priority Data
Mar. 31, 2016 (JP) .................. 2016-072742

(51) Int. Cl.
| | | |
|---|---|---|
| *C08J 3/20* | (2006.01) | |
| *C08L 23/00* | (2006.01) | |
| *C08L 77/00* | (2006.01) | |
| *C08L 77/04* | (2006.01) | |
| *C08L 23/12* | (2006.01) | |
| *B29C 48/00* | (2019.01) | |
| *B29C 48/68* | (2019.01) | |
| *B29K 23/00* | (2006.01) | |
| *B29K 77/00* | (2006.01) | |

(52) U.S. Cl.
CPC .............. *C08J 3/203* (2013.01); *C08J 3/20* (2013.01); *C08L 23/00* (2013.01); *C08L 23/12* (2013.01); *C08L 77/00* (2013.01); *C08L 77/04* (2013.01); *B29C 48/022* (2019.02); *B29C 48/682* (2019.02); *B29K 2023/00* (2013.01); *B29K 2077/00* (2013.01); *C08J 2377/00* (2013.01); *C08J 2423/02* (2013.01); *C08L 2205/08* (2013.01)

(58) Field of Classification Search
None
See application file for complete search history.

(56) References Cited

U.S. PATENT DOCUMENTS

| | | | | |
|---|---|---|---|---|
| 5,885,732 | A | * 3/1999 | Verhoog | ............. H01M 2/0262 429/120 |
| 2003/0176598 | A1 | 9/2003 | Takashima et al. | |
| 2014/0364569 | A1 | 12/2014 | Kito et al. | |
| 2014/0371394 | A1 | 12/2014 | Kito et al. | |
| 2015/0218373 | A1 | 8/2015 | Kawada et al. | |

FOREIGN PATENT DOCUMENTS

| | | |
|---|---|---|
| JP | 2003-049074 A | 2/2003 |
| JP | 2005-187809 A | 7/2005 |
| JP | 2013-147645 A | 8/2013 |
| JP | 2013-147646 A | 8/2013 |
| JP | 2013-147647 A | 8/2013 |
| JP | 2014-025060 A | 2/2014 |

OTHER PUBLICATIONS

Japanese Office Action issued in Japan Counterpart Patent Appl. No. JP 2017-556757, dated Jan. 31, 2018, along with an English translation thereof.
International Search Report in International Patent Application No. PCT/JP2017/010534, dated May 30, 2017.
U.S. Appl. No. 15/776,868 to Kito et al., which was filed on Nov. 29, 2016.
U.S. Appl. No. 15/776,867 to Kito et al., which was filed on Nov. 29, 2016.
U.S. Appl. No. 16/086,696 to Kito et al., which was filed on Mar. 15, 2017.
U.S. Appl. No. 16/073,589 to Kito et al., which was filed on Mar. 10, 2017.
U.S. Appl. No. 16/087,344 to Kito et al., which was filed on Mar. 7, 2017.
Chinese Office Action issued in Counterpart Patent Appl. No. CN 201780015656.2, dated Jan. 30, 2019, along with an English machine translation thereof.

(Continued)

*Primary Examiner* — Ana L. Woodward
(74) *Attorney, Agent, or Firm* — Greenblum & Bernstein, P.L.C.

(57) ABSTRACT

A thermoplastic resin composition, a method for manufacturing the same, and a molded body are provided. The composition includes a polyolefin resin PO, a polyimide resin PA, and a compatibilizer. The composition has a first phase composed of the PA and compatibilizer and/or a reaction product thereof and a second phase composed of the PO and interposed between the first phases. The first phase has a matrix phase composed of the PA and a dispersed phase dispersed in the matrix phase and composed of the compatibilizer and/or a reaction product thereof. The first phase includes a branched phase having branch portions. The method includes melt-kneading the PA and compatibilizer so that a mixing ratio of the compatibilizer is 11% by mass or more but 45% by mass or less per 100% by mass of a total of the PO, PA, and compatibilizer, and melt-kneading an obtained composition and the PO.

8 Claims, 4 Drawing Sheets

(56) References Cited

OTHER PUBLICATIONS

Chinese Office Action issued in Counterpart Patent Appl. No. CN 201780015656.2, dated Jul. 26, 2019, along with English language translation.
Office Action, India Patent Office, Application No. 201817027775, dated Dec. 24, 2019.
Extended European Search Report for EP Application No. 17774358, dated Oct. 22, 2019.

* cited by examiner

[FIG. 1]
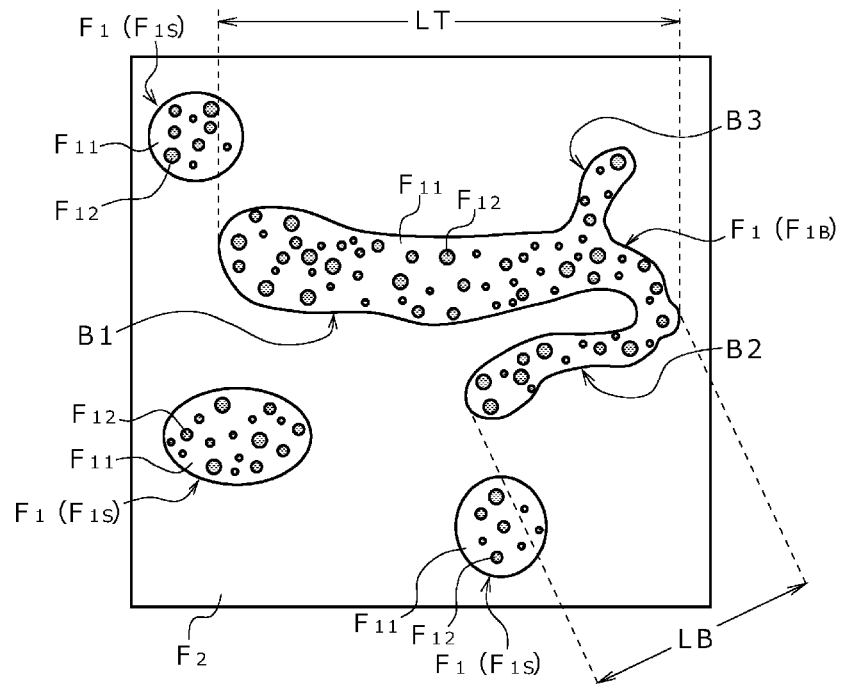
[FIG. 2]
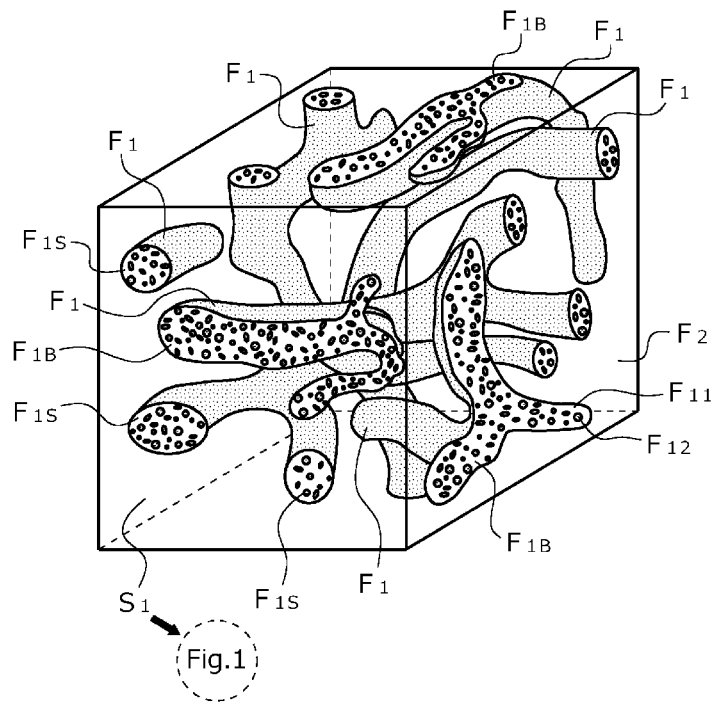

[FIG. 3]
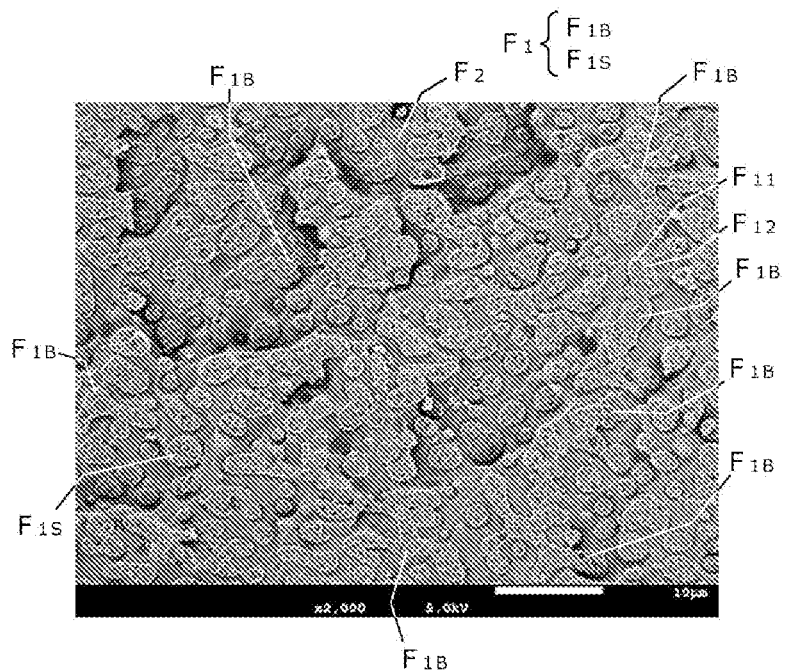
[FIG. 4]
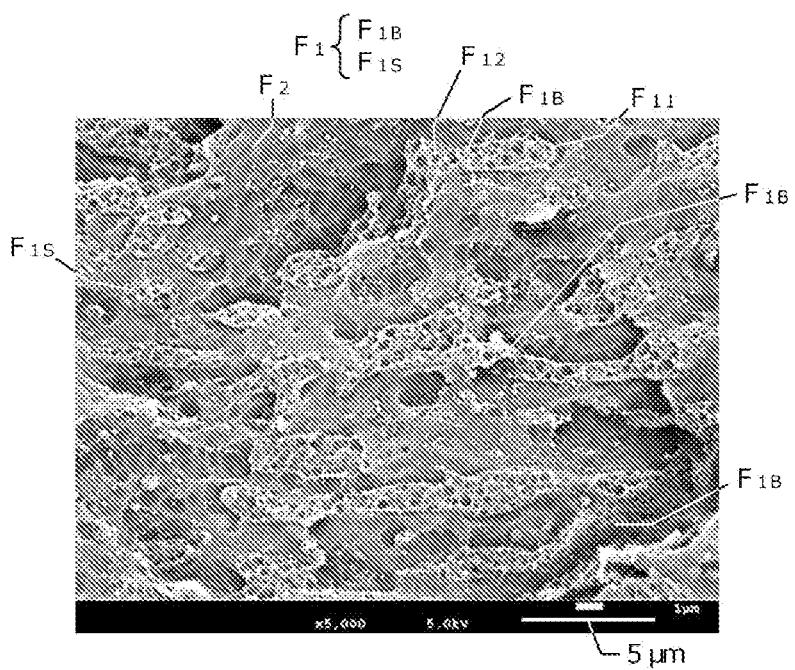

[FIG. 5]
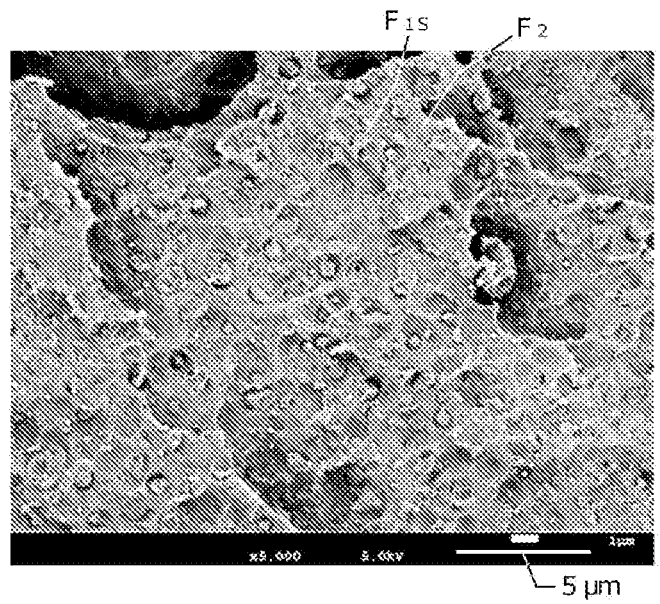
[FIG. 6]
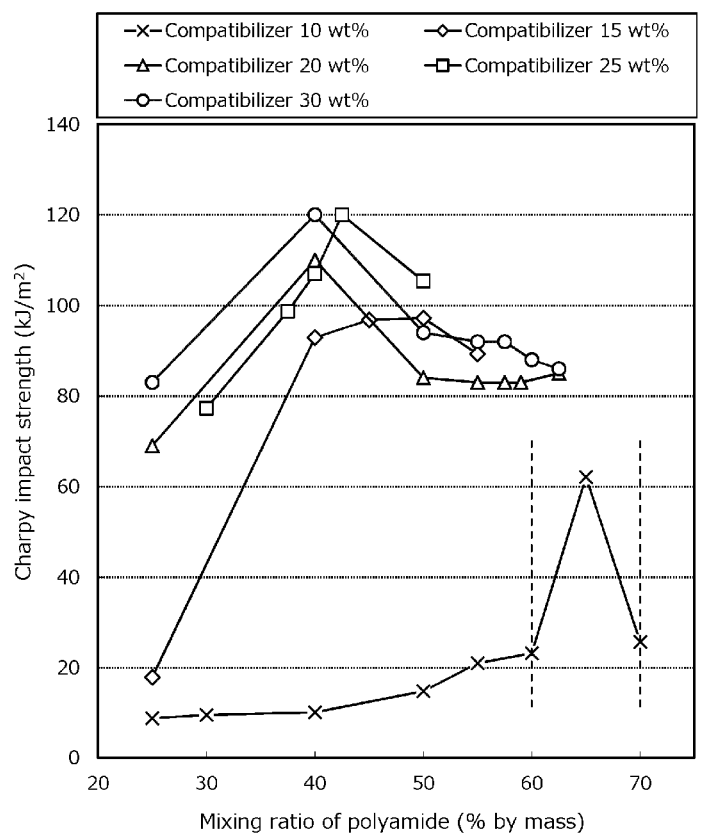

[FIG. 7]
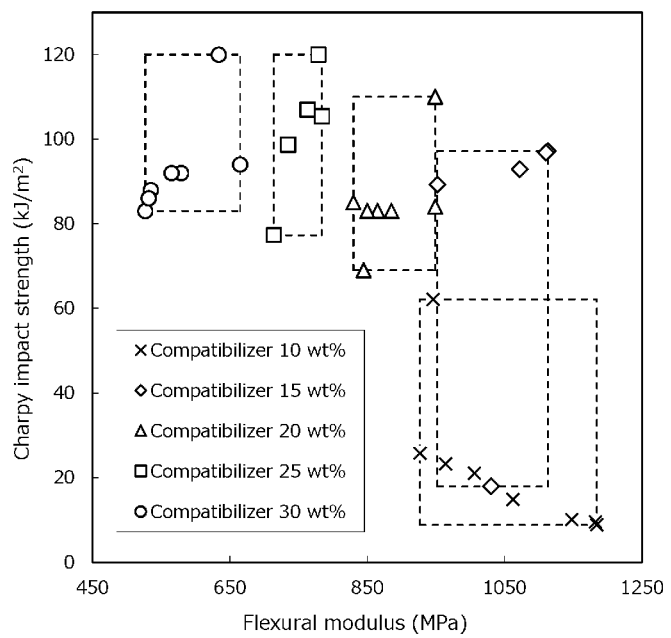

THERMOPLASTIC RESIN COMPOSITION, PRODUCTION METHOD THEREFOR, AND MOLDED BODY

TECHNICAL FIELD

The present invention relates to a thermoplastic resin composition, a method for manufacturing the same, and a molded body. More specifically, the present invention relates to a thermoplastic resin composition capable of exhibiting excellent mechanical properties, a method for manufacturing the same, and a molded body.

BACKGROUND ART

A conventional technique is known in which different raw material resins are mixed to obtain a resin composition (polymer blend, polymer alloy) having synergistic properties exceeding their respective properties.

For example, studies have been made to obtain a resin composition having a single phase (uniformly-mixed single phase) by uniformly mixing two or more compatible raw material resins.

Further, various techniques have been studied to obtain, even when two or more raw material resins having poor compatibility are mixed, a resin composition having two or more phases (e.g., a continuous phase and a dispersed phase) and synergistic properties exceeding the properties of the raw material resins. As such techniques, those disclosed in the following Patent Literatures 1 to 3 are known.

CITATIONS LIST

Patent Literatures

Patent Literature 1: JP 2003-049074 A
Patent Literature 2: JP 2005-187809 A
Patent Literature 3: JP 2014-025060 A

SUMMARY OF INVENTION

Technical Problems

Patent Literature 1 discloses a thermosetting resin composition that is obtained using a bisphenol-type epoxy resin and polybutene so as to have a multiphase structure having a continuous phase and a dispersed phase and further having a fine dispersed phase provided in the dispersed phase. Further, Patent Literature 2 discloses a thermoplastic resin composition that is obtained using nylon 6 and modified polyethylene or polybutylene terephthalate and modified polyethylene in combination so as to have a multiphase structure having a continuous phase, a dispersed phase, and a fine dispersed phase.

In these resin compositions obtained by the techniques disclosed in Patent Literatures 1 and 2, the dispersed phase and the fine dispersed phase are in the form of particles (FIG. 2 in Patent Literature 1, FIGS. 1 to 3 in Patent Literature 2). As described above, it is generally considered that when resins having poor compatibility are mixed, excellent properties can be exhibited by more uniformly mixing the resins, and a phase structure obtained by uniform mixing is due to the presence of a dispersed phase dispersed in the form of particles.

On the other hand, Patent Literature 3 discloses a thermoplastic resin composition that is obtained using a polyolefin resin and a polyamide resin and has excellent mechanical strength due to its special phase structure in which both the resins each independently form continuous phases and each of the continuous phases has a dispersed phase therein.

However, such a co-continuous phase structure in which both the resins each independently form continuous phases is achieved by mixing the resins in a ratio within a narrow range. Therefore, when the technique disclosed in Patent Literature 3 is industrially practically used, there is a case where the compositions of raw materials vary or conditions in a manufacturing process vary, and therefore it is necessary to severely control raw materials and manufacturing conditions to allow a final product to stably have a co-continuous phase structure. This leads to a problem of cost increase. That is, the technique disclosed in Patent Literature 3 is excellent, but tends to have low robustness and is difficult to practically use.

In light of the above circumstances, it is therefore an object of the present invention to provide a thermoplastic resin composition with a novel phase structure which can exhibit excellent mechanical strength in spite of the fact that its composition can be selected from a wider range than ever before and raw material selection and manufacturing control can be performed more flexibly than ever before, a method for manufacturing the same, and a molded body.

Solutions to Problems

In order to achieve the above object, the present invention provides the following.

In one embodiment, a thermoplastic resin composition is obtained by mixing a polyolefin resin, a polyamide resin, and a compatibilizer, characterized in that the omposition has a first phase ($F_1$) composed of the polyamide resin and the compatibilizer and/or a reaction product thereof, and a second phase ($F_2$) composed of the polyolefin resin and interposed between the first phases ($F_1$), that the first phase ($F_1$) has a matrix phase ($F_{11}$) composed of the polyamide resin and a dispersed phase ($F_{12}$) dispersed in the matrix phase ($F_{11}$) and composed of the compatibilizer and/or a reaction product thereof, and that the first phase ($F_1$) comprises a branched phase having branch portions.

In one embodiment of the thermoplastic resin composition, the branched phase has a maximum length of 7 μm or more.

In one embodiment of the thermoplastic resin composition, the branched phase has a branch portion having a maximum length of 3 μm or more.

In one embodiment of the thermoplastic resin composition, the dispersed phase ($F_{12}$) in the first phase ($F_1$) has an average dispersion diameter of 500 nm or less.

In one embodiment of the thermoplastic resin composition, the first phase ($F_1$) is a dispersed phase dispersed in the second phase ($F_2$).

In one embodiment of the thermoplastic resin composition, when a total of the polyolefin resin, the polyamide resin, and the compatibilizer is taken as 100% by mass, a mixing ratio of the compatibilizer is 11% by mass or more but 45% by mass or less.

In one embodiment of the thermoplastic resin composition, when a total of the polyolefin resin, the polyamide resin, and the compatibilizer is taken as 100% by mass, a mixing ratio of the polyamide resin is 25% by mass or more but 65% by mass or less.

In one embodiment, the molded body includes the thermoplastic resin composition according to any one of claims 1 to 7.

In one embodiment, the method for manufacturing a thermoplastic resin composition comprises:

a first melt-kneading step in which the polyamide resin and the compatibilizer are melt-kneaded so that a mixing ratio of the compatibilizer is 11% by mass or more but 45% by mass or less when a total of the polyolefin resin, the polyamide resin, and the compatibilizer is taken as 100% by mass, and a second melt-kneading step in which a first composition obtained in the first melt-kneading step and the polyolefin resin are melt-kneaded.

In one embodiment of the method for manufacturing a thermoplastic resin composition, when a total of the polyolefin resin, the polyamide resin, and the compatibilizer is taken as 100% by mass, a mixing ratio of the polyamide resin is 25% by mass or more but 65% by mass or less.

ADVANTAGEOUS EFFECTS OF INVENTION

According to the present invention, it is possible to provide a thermoplastic resin composition with a novel phase structure which can exhibit excellent mechanical strength in spite of the fact that its composition can be selected from a wider range than ever before and raw material selection and manufacturing control can be performed more flexibly than ever before.

According to the present invention, it is possible to provide a molded body with a novel phase structure which can exhibit excellent mechanical strength in spite of the fact that its composition can be selected from a wider range than ever before and raw material selection and manufacturing control can be performed more flexibly than ever before.

According to the present invention, it is possible to provide a method for manufacturing a thermoplastic resin composition capable of manufacturing a thermoplastic resin composition with a novel phase structure which can exhibit excellent mechanical strength in spite of the fact that its composition can be selected from a wider range than ever before and raw material selection and manufacturing control can be performed more flexibly than ever before.

BRIEF DESCRIPTION OF DRAWINGS

The present invention will be further described in the following detailed description based on non-limiting examples of exemplary embodiments of the present invention with reference to the noted drawings, and the same components in some of the drawings are denoted by the same reference signs.

FIG. 1 is a schematic diagram illustrating a phase structure of a thermoplastic resin composition.

FIG. 2 is a schematic perspective view of the phase structure.

FIG. 3 is an explanatory image obtained by FE-SEM observation of a thermoplastic resin composition (Experimental Example 10).

FIG. 4 is an explanatory image obtained by FE-SEM observation of a thermoplastic resin composition (Experimental Example 25).

FIG. 5 is an explanatory image obtained by FE-SEM observation of a thermoplastic resin composition (Experimental Example 14).

FIG. 6 is a graph showing a correlation between the mixing ratio of a polyamide resin and Charpy impact strength when the mixing ratio of a compatibilizer is changed.

FIG. 7 is a graph showing a correlation between flexural modulus and Charpy impact strength when the mixing ratio of a compatibilizer is changed.

DESCRIPTION OF EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how some of the forms of the present invention may be embodied in practice.

[1] Thermoplastic Resin Composition

<1> Phase Structure

A thermoplastic resin composition according to the present invention (hereinafter also simply referred to as "present composition") is obtained by mixing a polyolefin resin, a polyamide resin, and a compatibilizer.

The present composition has a first phase ($F_1$) and a second phase ($F_2$) interposed between the first phases ($F_1$), and the first phase ($F_1$) further has a matrix phase ($F_{11}$) and a dispersed phase ($F_{12}$) dispersed in the matrix phase ($F_{11}$).

In addition, the present composition has, as the first phase ($F_1$), a branched phase ($F_{1B}$) having branch portions (B, B1 to B3) (see FIGS. 1 to 3).

Such a branched phase ($F_{1B}$) can be recognized by observing the surface of a test specimen (test specimen made of the present composition) subjected to oxygen plasma etching treatment and then to osmium coating treatment with the use of a field emission scanning electron microscope (FE-SEM). Particularly, the branched phase ($F_{1B}$) is observed by magnifying an image obtained in such a manner as described above 1000 times or more (usually 10,000 times or less). It is to be noted that the phase structure other than the branched phase ($F_{1B}$) can also be observed in the same manner as described above.

The branched phase ($F_{1B}$) is a phase having branch portions (B, B1 to B3) (see FIG. 1). That is, the branched phase is a phase branched into two or more branches (exemplified as $F_{1B}$ in FIG. 1). Some of the first phases ($F_1$) may be branched phases ($F_{1B}$), or all the first phases ($F_1$) may be branched phases ($F_{1B}$).

The size of the branched phase ($F_{1B}$) is not particularly limited, but the branched phase ($F_{1B}$) preferably has a maximum length (length denoted by LT in FIG. 1) of 7 μm or more. That is, the present composition may have a branched phase ($F_{1B}$) having a maximum length of less than 7 μm, but preferably has a branched phase ($F_{1B}$) having a maximum length of 7 μm or more.

More specifically, the present composition preferably has at least one branched phase ($F_{1B}$) having a maximum length of 7 μm or more per 40 micrometers square observed by the above-described FE-SEM observation. Further, the number of branched phases ($F_{1B}$) having a maximum length of 7 μm or more per 40 micrometers square of the present composition is preferably 2 or more, more preferably 3 or more, even more preferably 4 or more, even more preferably 5 or more.

In addition, the number of branched phases ($F_{1B}$) having a maximum length of 10 μm or more per 40 micrometers square of the present composition observed by the above-described FE-SEM observation is preferably 1 or more, more preferably 2 or more, even more preferably 3 or more.

The size of the branch portion (B, exemplified as B1 to B3 in FIG. 1) is not particularly limited, either. However, the branched phase ($F_{1B}$) preferably has a maximum length (denoted by LB in FIG. 1 as the maximum length of a branch portion B2) of 3 μm or more. That is, the present composition may have a branch portion (B) having a maximum length of less than 3 μm, but preferably has a branch portion (B) having a maximum length of 3 μm or more.

More specifically, one branched phase ($F_{1B}$) observed by the above-described FE-SEM observation preferably has at least one branch portion (B) having a maximum length of 3 μm or more. Further, the number of branch portions (B) having a maximum length of 3 μm or more that one branched phase ($F_{1B}$) has is preferably 2 or more, more preferably 3 or more.

It is to be noted that when one branched phase ($F_{1B}$) has 3 or more branch portions (B), only one of the branch portions (B) may have a maximum length LB of 3 μm or more, but of course, two or more of the branch portions (B) may have a maximum length LB of 3 μm or more.

Such a thermoplastic resin composition having a branched phase ($F_{1B}$) can exhibit excellent mechanical strength over a wide composition range. That is, the thermoplastic resin composition having a branched phase ($F_{1B}$) has excellent robustness.

The reason why the thermoplastic resin composition having a branched phase ($F_{1B}$) exhibits such a property is not clear. However, it is considered that when the branched phase ($F_{1B}$) is observed, as shown in FIG. 2, the first phase ($F_1$) has a three-dimensional continuous structure in the second phase ($F_2$). That is, it is considered that the first phase ($F_1$) has a three-dimensional tree-like shape such as a coral-like shape in the second phase ($F_2$). Therefore, the fact that the branched phase ($F_{1B}$) is observed in a certain surface (e.g., a surface $S_1$ shown in FIG. 2) (FIG. 1 is a schematic diagram of the surface $S_1$) means that the first phase ($F_1$) has also a three-dimensional branched structure in the second phase ($F_2$). It is considered that having such a three-dimensional network contributes to a unique property that excellent mechanical strength can be exhibited over a wide composition range. It can be said that the existence of such a thermoplastic resin composition having a high degree of freedom makes it possible to design products having excellent robustness, and significantly contributes to actual product design.

The correlation between the first phase ($F_1$) and the second phase ($F_2$) is not particularly limited, and the first phase ($F_1$) may be present as a dispersed phase dispersed in the second phase ($F_2$), or the first phase ($F_1$) and the second phase ($F_2$) may be both continuous phases.

Further, for example, spherical phases ($F_{1S}$) may also be contained as the first phases ($F_1$) as long as at least some of the first phases ($F_1$) are branched phases ($F_{1B}$).

Further, among the above-described phases, the first phase ($F_1$) is composed of a polyamide resin and a compatibilizer and/or a reaction product thereof, and has a multiphase structure. More specifically, the first phase ($F_1$) has a matrix phase ($F_{11}$) and a dispersed phase ($F_{12}$), and the matrix phase ($F_{11}$) is composed of a polyamide resin, and the dispersed phase ($F_{12}$) is composed of a compatibilizer and/or a reaction product thereof. The reaction product of a compatibilizer is usually a reaction product of a compatibilizer with a polyamide resin.

The present composition usually has a matrix phase ($F_{11}$) and a dispersed phase ($F_{12}$), but does not have a fine dispersed phase further dispersed in the dispersed phase ($F_{12}$). Further, the first phase ($F_1$) does not usually have a dispersed phase composed of a polyolefin resin therein.

On the other hand, the second phase ($F_2$) is composed of a polyolefin resin.

The component constituting each of these phases is identified by performing energy dispersive X-ray analysis (EDS) during observation using a field emission scanning electron microscope (FE-SEM).

Further, as described above, the first phase ($F_1$) has a matrix phase ($F_{11}$) and a dispersed phase ($F_{12}$) dispersed in the matrix phase ($F_{11}$) (see FIG. 1). The average dispersion diameter of the dispersed phase ($F_{12}$) is not particularly limited, but may be 500 nm or less. When the average dispersion diameter of the dispersed phase ($F_{12}$) is 500 nm or less, excellent mechanical strength balance can be achieved.

The average dispersion diameter is preferably 50 nm or more but 500 nm or less, more preferably 60 nm or more but 480 nm or less, even more preferably 80 nm or more but 460 nm or less, even more preferably 100 nm or more but 440 nm or less, even more preferably 110 nm or more but 420 nm or less, even more preferably 120 nm or more but 400 nm or less, even more preferably 140 nm or more but 380 nm or less, even more preferably 160 nm or more but 360 nm or less, even more preferably 180 nm or more but 340 nm or less, even more preferably 170 nm or more but 320 nm or less, even more preferably 150 nm or more but 300 nm or less.

It is to be noted that the above-described average dispersion diameter is determined in the following manner. A test specimen made of the obtained thermoplastic resin composition is prepared, and the longest diameter of each of 20 particles of the dispersed phase ($F_{12}$) randomly selected within a predetermined region in an image of the test piece magnified 5000 times or more is measured, and the average of the measured longest diameters is determined as a first average value. Then, the first average value of each of different five regions in the image is determined, and the average of the first average values is further determined as an average dispersion diameter (i.e. a major axis-average dispersion diameter).

Further, the area ratio of the dispersed phase ($F_{12}$) to the first phase ($F_1$) is not particularly limited, but may exceed 50%. When the area ratio exceeds 50%, excellent mechanical strength balance can be achieved.

The area ratio is preferably 51% or more but 95% or less, more preferably 53% or more but 92% or less, even more preferably 55% or more but 90% or less, even more preferably 57% or more but 88% or less, even more preferably 59% or more but 86% or less, even more preferably 61% or more but 84% or less, even more preferably 63% or more but 82% or less, even more preferably 65% or more but 80% or less.

<2> Components
(1) Polyolefin Resin

The polyolefin resin is an olefin homopolymer and/or an olefin copolymer.

An olefin constituting the polyolefin resin is not particularly limited, and examples thereof include ethylene, propylene, 1-butene, 3-methyl-1-butene, 1-pentene, 3-methyl-1-pentene, 4-methyl-1-pentene, 1-hexene, and 1-octene. These olefins may be used singly or in combination of two or more of them.

Specific examples of the polyolefin resin include a polyethylene resin, a polypropylene resin, poly-1-butene, poly-1-hexene, and poly-4-methyl-1-pentene. These polymers may be used singly or in combination of two or more of them. That is, the polyolefin resin may be a mixture of two or more of the above polymers.

Examples of the polyethylene resin include an ethylene homopolymer and a copolymer of ethylene and another olefin. Examples of the latter include an ethylene-1-butene copolymer, an ethylene-1-hexene copolymer, an ethylene-1-octene copolymer, and an ethylene-4-methyl-1-pentene copolymer (the content of an ethylene-derived structural unit is 50% or more of the total structural units).

Examples of the polypropylene resin include a propylene homopolymer and a copolymer of propylene and another olefin.

Examples of the other olefin constituting the copolymer of propylene and another olefin include the above-mentioned various olefins (except for propylene). Among them, for example, ethylene and 1-butene are preferred. That is, the copolymer of propylene and another olefin is preferably a propylene-ethylene copolymer or a propylene-1-butene copolymer.

Further, the copolymer of propylene and another olefin may be either a random copolymer or a block copolymer. Among them, a block copolymer is preferred in terms of excellent mechanical strength. Particularly, a propylene-ethylene block copolymer having ethylene as another olefin is preferred. This propylene-ethylene block copolymer is a block copolymerized polypropylene having an ethylene block as a dispersed phase. More specifically, the propylene-ethylene block copolymer is a polypropylene resin having a continuous phase composed of homopolypropylene and a dispersed phase present in the continuous phase and containing polyethylene. Such a block copolymerized polypropylene having an ethylene block as a dispersed phase is also called, for example, an impact copolymer, a polypropylene impact copolymer, a heterophasic polypropylene, or a heterophasic block polypropylene. This block copolymerized polypropylene is preferred in terms of excellent mechanical strength.

It is to be noted that the content of a propylene-derived structural unit of the copolymer of propylene and another olefin is 50% or more of the total structural units.

The weight-average molecular weight (based on polystyrene standards) of the polyolefin resin measured by gel permeation chromatography (GPC) is not particularly limited, and may be, for example, 10,000 or more but 500,000 or less, but is preferably 100,000 or more but 450,000 or less, more preferably 200,000 or more but 400,000 or less.

It is to be noted that the polyolefin resin is a polyolefin that has no affinity for the polyamide resin, which will be described later, and that has no reactive group capable of reacting with the polyamide resin, either. The polyolefin resin is different from the compatibilizer in this point.

(2) Polyamide Resin

The "polyamide resin" is a polymer having a chain-like skeleton formed by polymerizing a plurality of monomers via amide bonds (—NH—CO—).

Examples of a monomer constituting the polyamide resin include: amino acids such as 6-aminocaproic acid, 11-aminoundecanoic acid, 12-aminododecanoic acid, and para-aminomethylbenzoic acid; and lactams such as ε-caprolactam, undecane lactam, and ω-lauryllactam. These olefins may be used singly or in combination of two or more of them.

Further, the polyamide resin can be obtained also by copolymerization of a diamine and a dicarboxylic acid. In this case, examples of the diamine as a monomer include: aliphatic diamines such as ethylenediamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; alicyclic diamines such as cyclohexanediamine and bis-(4-aminocyclohexyl)methane; and aromatic diamines such as xylylenediamines (e.g., p-phenylenediamine and m-phenylenediamine). These olefins may be used singly or in combination of two or more of them.

Further, examples of the dicarboxylic acid as a monomer include: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; alicyclic dicarboxylic acids such as cyclohexanedicarboxylic acids; and aromatic dicarboxylic acids such as phthalic acid, terephthalic acid, isophthalic acid, and naphthalene dicarboxylic acid. These olefins may be used singly or in combination of two or more of them.

Specific examples of the polyamide resin include polyamide 6, polyamide 66, polyamide 11, polyamide 610, polyamide 612, polyamide 614, polyamide 12, polyamide 6T, polyamide 6I, polyamide 9T, polyamide M5T, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T. These polyamides may be used singly or in combination of two or more of them.

In the present invention, among the above-described various polyamide resins, plant-derived polyamide resins can be used. Plant-derived polyamide resins are preferred from the viewpoint of environmental protection (particularly from the viewpoint of carbon neutral) because they are resins using monomers derived from plant-derived components such as vegetable oils.

Examples of the plant-derived polyamide resins include polyamide 11 (hereinafter, also simply referred to as "PA11"), polyamide 610 (hereinafter, also simply referred to as "PA610"), polyamide 612 (hereinafter, also simply referred to as "PA612"), polyamide 614 (hereinafter, also simply referred to as "PA614"), polyamide 1010 (hereinafter, also simply referred to as "PA1010"), polyamide 1012 (hereinafter, also simply referred to as "PA1012"), and polyamide 10T (hereinafter, also simply referred to as "PA10T"). These olefins may be used singly or in combination of two or more of them.

Among the above plant-derived polyamide resins, PA11 has a structure in which monomers having 11 carbon atoms are linked via amide bonds. PA11 can be obtained using aminoundecanoic acid derived from castor oil as a monomer. The content of a structural unit derived from the monomer having 11 carbon atoms in PA11 is preferably 50% or more or may be 100% of all the structural units of PA11.

PA610 has a structure in which monomers having 6 carbon atoms and monomers having 10 carbon atoms are linked via amide bonds. PA610 can be obtained using sebacic acid derived from castor oil as a monomer. The total content of a structural unit derived from the monomer having 6 carbon atoms and a structural unit derived from the monomer having 10 carbon atoms in PA610 is preferably 50% or more or may be 100% of all the structural units of PA610.

PA1010 has a structure in which a diamine having 10 carbon atoms and a dicarboxylic acid having 10 carbon atoms are copolymerized. PA1010 can be obtained using 1,10-decanediamine (decamethylenediamine) and sebacic acid, which are derived from castor oil, as monomers. The total content of a structural unit derived from the diamine having 10 carbon atoms and a structural unit derived from the dicarboxylic acid having 10 carbon atoms in PA1010 is preferably 50% or more or may be 100% of all the structural units of PA1010.

PA614 has a structure in which monomers having 6 carbon atoms and monomers having 14 carbon atoms are linked via amide bonds. PA614 can be obtained using a plant-derived dicarboxylic acid having 14 carbon atoms as a monomer. The total content of a structural unit derived from the monomer having 6 carbon atoms and a structural unit derived from the monomer having 14 carbon atoms in PA614 is preferably 50% or more or may be 100% of all the structural units of PA614.

PA10T has a structure in which a diamine having 10 carbon atoms and terephthalic acid are linked via amide bonds. PA10T can be obtained using 1,10-decanediamine (decamethylenediamine) derived from castor oil as a monomer. The total content of a structural unit derived from the diamine having 10 carbon atoms and a structural unit derived from terephthalic acid in PA10T is preferably 50% or more or may be 100% of all the structural units of PA10T.

Among the above five plant-derived polyamide resins, PA11 is superior to the other four plant-derived polyamide resins in terms of low water absorbability, low specific gravity, and high biomass degree.

Polyamide 610 is inferior to PA11 in water absorption rate, chemical resistance, and impact strength, but is excellent in heat resistance (melting point) and rigidity (strength). Further, polyamide 610 is superior to polyamide 6 or polyamide 66 in terms of low water absorbability and excellent size stability, and therefore can be used as an alternative to polyamide 6 or polyamide 66.

Polyamide 1010 is superior to PA11 in heat resistance and rigidity. Further, the biomass degree of polyamide 1010 is comparable to that of PA11, and therefore polyamide 1010 can be used for parts required to have higher durability.

Polyamide 10T has an aromatic ring in its molecular framework, and therefore has a higher melting point and higher rigidity than polyamide 1010. Therefore, polyamide 10T can be used in harsh environments (parts required to have heat resistance, parts on which a force is to be exerted).

The weight-average molecular weight (based on polystyrene standards) of the polyamide resin measured by gel permeation chromatography (GPC) is not particularly limited, and may be, for example, 5,000 or more but 100,000 or less, but is preferably 7,500 or more but 50,000 or less, more preferably 10,000 or more but 50,000 or less.

(3) Compatibilizer

The compatibilizer is a component capable of exhibiting compatibility with both the polyamide resin and the polyolefin resin. The compatibilizer preferably has a reactive group that reacts with the polyamide resin. Further, the compatibilizer is preferably an elastomer.

Examples of the reactive group include an acid anhydride group (—CO—O—OC—), a carboxyl group (—COOH), an epoxy group {—C$_2$O (a three-membered ring structure composed of two carbon atoms and one oxygen atom)}, an oxazoline group (—C$_3$H$_4$NO), and an isocyanate group (—NCO). These olefins may be used singly or in combination of two or more of them.

Therefore, the compatibilizer is preferably a modified elastomer (modified product obtained by introducing the above reactive group into the elastomer by modification). Specific examples of such a modified elastomer include an acid-modified elastomer, an epoxy-modified elastomer, and an oxazoline-modified elastomer. Among them, an acid-modified elastomer is preferred, and an acid anhydride-modified elastomer or a carboxylic acid-modified elastomer is more preferred.

The compatibilizer is particularly preferably an elastomer having an acid anhydride group or a carboxyl group in the side chain or at the end of its molecule. The amount of acid modification is not particularly limited. For example, the number of acid anhydride groups or carboxyl groups contained in one molecule of the acid-modified elastomer is preferably 1 or more, more preferably 2 or more but 50 or less, even more preferably 3 or more but 30 or less, particularly preferably 5 or more but 20 or less.

The above compatibilizers may be used singly or in combination of two or more of them.

Examples of the elastomer before modification include an olefin-based elastomer and a styrene-based elastomer. Particularly, the elastomer before modification is preferably an olefin-based elastomer.

The olefin-based elastomer is preferably an α-olefin-based copolymer containing a structural unit derived from an α-olefin having 3 to 8 carbon atoms, and examples thereof include an ethylene-α-olefin copolymer, an α-olefin copolymer, an α-olefin-non-conjugated diene copolymer, and an ethylene-α-olefin-non-conjugated diene copolymer. Among them, an ethylene-α-olefin copolymer, an α-olefin copolymer, and an ethylene-α-olefin-non-conjugated diene copolymer are particularly preferred.

Examples of the non-conjugated diene include: linear non-cyclic diene compounds such as 1,4-pentadiene, 1,4-hexadiene, 1,5-hexadiene, and 1,6-hexadiene; branched chain non-cyclic diene compounds such as 5-methyl-1,4-hexadiene, 3,7-dimethyl-1,6-octadiene, 5,7-dimethylocta-1,6-diene, 3,7-dimethyl-1,7-octadiene, 7-methyl octa-1,6-diene, and dihydromyrcene; and alicyclic diene compounds such as tetrahydroindene, methyltetrahydroindene, dicyclopentadiene, bicyclo[2.2.1]-hepta-2,5-diene, 5-methylene-2-norbornene, 5-ethylidene-2-norbornene, 5-propenyl-2-norbornene, 5-isopropylidene-2-norbornene, 5-cyclohexylidene-2-norbornene, and 5-vinyl-2-norbornene.

Specific examples of the olefin elastomer include an ethylene-propylene copolymer, an ethylene-1-butene copolymer, an ethylene-1-pentene copolymer, an ethylene-1-hexene copolymer, an ethylene-1-octene copolymer, a propylene-1-butene copolymer, a propylene-1-pentene copolymer, a propylene-1-hexene copolymer, and a propylene-1-octene copolymer. Among them, an ethylene-propylene copolymer, an ethylene-1-butene copolymer, and an ethylene-1-octene copolymer are preferred.

Examples of the styrene-based elastomer include a block copolymer of an aromatic vinyl compound and a conjugated diene compound and a hydrogenated product thereof.

Examples of the aromatic vinyl compound include: styrene; alkylstyrenes such as α-methylstyrene, p-methylstyrene, and p-tert-butylstyrene; p-methoxystyrene; and vinylnaphthalene.

Examples of the conjugated diene compound include butadiene, isoprene, 1,3-pentadiene, methylpentadiene, phenylbutadiene, 3,4-dimethyl-1,3-hexadiene, and 4,5-diethyl-1,3-octadiene.

Specific examples of the styrene-based elastomer include styrene-butadiene-styrene copolymers (SBSs), styrene-isoprene-styrene copolymers (SISs), styrene-ethylene/butylene-styrene copolymers (SEBSs), and styrene-ethylene/propylene-styrene copolymers (SEPSs).

The weight-average molecular weight (based on polystyrene standards) of the above-described elastomer measured by gel permeation chromatography (GPC) is not particularly limited, but is, for example, preferably 10,000 or more but 500,000 or less, more preferably 20,000 or more but 500,000 or less, even more preferably 30,000 or more but 300,000 or less from the viewpoint of achieving excellent impact resistance and impact energy absorbability.

Examples of the acid anhydride for acid modification include maleic anhydride, phthalic anhydride, itaconic anhydride, succinic anhydride, glutaric anhydride, adipic anhydride, citraconic anhydride, tetrahydrophthalic anhydride and, butenyl succinic anhydride. Among them, maleic anhydride, phthalic anhydride, and itaconic anhydride are preferred.

Examples of the carboxylic acid include acrylic acid, methacrylic acid, maleic acid, fumaric acid, itaconic acid, and citraconic acid.

The compatibilizer is preferably an elastomer modified with an acid anhydride, particularly preferably an elastomer modified with maleic anhydride, more particularly preferably an acid-modified product of an α-olefin-based copolymer containing a structural unit derived from an α-olefin having 3 to 8 carbon atoms. Specific examples thereof preferably include maleic anhydride-modified elastomers such as a maleic anhydride-modified ethylene-propylene copolymer, a maleic anhydride-modified ethylene-1-butene copolymer, a maleic anhydride-modified ethylene-1-hexene copolymer, and a maleic anhydride-modified ethylene-1-octene copolymer. More specifically, for example, an α-olefin copolymer "TAFMER series" (trade name) manufactured by Mitsui Chemicals, Inc. or "AMPLIFY series" (trade name) manufactured by The Dow Chemical Company can be used.

The first phase ($F_1$) may be directly contained in the second phase ($F_2$), but an interfacial phase may be provided in at least part of the interface between the first phase ($F_1$) and the second phase ($F_2$). The interfacial phase usually contains a compatibilizer or a reaction product of a polyamide resin with a compatibilizer. It is to be noted that the thickness of the interfacial phase is not particularly limited.

(4) Other Components

The present composition may contain other components in addition to the polyolefin resin, the polyamide resin, and the compatibilizer. These olefins may be used singly or in combination of two or more of them.

Examples of the other components include another thermoplastic resin other than the polyamide resin and the polyolefin resin, and the like. Examples of the other thermoplastic resin include polyester-based resins (polybutylene terephthalate, polyethylene terephthalate, polycarbonate, polybutylene succinate, polyethylene succinate, and polylactic acid). These olefins may be used singly or in combination of two or more of them.

Further, examples of an additive that can be mixed include a nucleating agent, an antioxidant, a heat stabilizer, a weathering agent, a light stabilizer, a plasticizer, an ultraviolet absorber, an antistatic agent, a flame retardant, a slip agent, an antiblocking agent, an anti-fogging agent, a lubricant, a pigment, a dye, a dispersant, a copper inhibitor, a neutralizer, an anti-foaming agent, a weld strength improver, a natural oil, a synthetic oil, and a wax. These olefins may be used singly or in combination of two or more of them.

Examples of the nucleating agent and the reinforcing filler include silicates such as talc, silica, clay, montmorillonite, and kaolin; carbonates such as calcium carbonate, lithium carbonate, and magnesium carbonate; metal oxides such as alumina, titanium oxide, and zinc oxide; metals such as aluminum, iron, silver, and copper; hydroxides such as aluminum hydroxide and magnesium hydroxide; sulfides such as barium sulfate; carbides such as charcoal and bamboo charcoal; titanides such as potassium titanate and barium titanate; celluloses such as cellulose microfibrils and cellulose acetate; fibrous fillers such as glass fibers, polyethylene terephthalate fibers, nylon fibers, polyethylene naphthalate fibers, aramid fibers, vinylon fibers, and polyarylate fibers; carbons such as fullerene and carbon nanotubes.

Examples of the antioxidant include phenol-based compounds, organic phosphite-based compounds, and thioether-based compounds.

Examples of the heat stabilizer include hindered amine-based compounds.

Examples of the ultraviolet absorber include benzophenone-based compounds, benzotriazole-based compounds, and benzoate-based compounds.

Examples of the antistatic agent include nonionic compounds, cationic compounds, and anionic compounds.

Examples of the flame retardant include halogen-based compounds, phosphorus-based compounds (e.g., nitrogen-containing phosphate compounds and phosphate esters), nitrogen-based compounds (e.g., guanidine, triazine, melamine, and derivatives thereof), inorganic compounds (e.g., metal hydroxides), boron-based compounds, silicone-based compounds, sulfur-based compounds, and red phosphorus-based compounds.

Examples of the flame retardant aid include antimony compounds, zinc compounds, bismuth compounds, magnesium hydroxide, and clayey silicate.

<3> (4) Mixing

When the total of the first phase ($F_1$) and the second phase ($F_2$) in the present composition is taken as 100% by mass, the ratio of the first phase ($F_1$) may be 90% by mass or less (particularly, 2% by mass or more but 90% by mass or less). The ratio of the first phase ($F_1$) is preferably 5% by mass or more but 85% by mass or less, more preferably 10% by mass or more but 83% by mass or less, even more preferably 15% by mass or more but 80% by mass or less, even more preferably 20% by mass or more but 78% by mass or less, even more preferably 25% by mass or more but 75% by mass or less, even more preferably 30% by mass or more but 73% by mass or less, even more preferably 35% by mass or more but 70% by mass or less.

That is, the ratio of the second phase ($F_2$) may be 10% by mass or more (particularly 10% by mass or more but 98% by mass or less), more preferably 15% by mass or more but 95% by mass or less, even more preferably 17% by mass or more but 90% by mass or less, even more preferably 20% by mass or more but 85% by mass or less, even more preferably 22% by mass or more but 80% by mass or less, even more preferably 25% by mass or more but 75% by mass or less, even more preferably 27% by mass or more but 70% by mass or less, even more preferably 30% by mass or more but 65% by mass or less.

When the ratio of the first phase ($F_1$) is within the above range, particularly excellent mechanical strength balance can be achieved. Particularly, an excellent balance of impact resistance and flexural modulus can be achieved.

Further, when the whole of the first phase ($F_1$) in the present composition is taken as 100% by mass, the ratio of the compatibilizer may be 20% by mass or more but 90% by mass or less. The ratio of the compatibilizer is preferably 22% by mass or more but 88% by mass or less, more preferably 25% by mass or more but 86% by mass or less, even more preferably 27% by mass or more but 75% by mass or less, even more preferably 29% by mass or more but 70% by mass or less, even more preferably 32% by mass or more but 66% by mass or less, even more preferably 36% by mass or more but 60% by mass or less.

That is, when the whole of the first phase ($F_1$) is taken as 100% by mass, the ratio of the polyamide resin may be 10% by mass or more but 80% by mass or less, but is preferably 12% by mass or more but 78% by mass or less, more preferably 14% by mass or more but 75% by mass or less, even more preferably 25% by mass or more but 73% by mass or less, even more preferably 30% by mass or more but 71% by mass or less, even more preferably 34% by mass or more but 68% by mass or less, even more preferably 40% by mass or more but 64% by mass or less.

When the ratio of the compatibilizer is within the above range, the first phase ($F_1$) can particularly be made smaller. That is, when the first phase ($F_1$) is present as a dispersed phase in the second phase ($F_2$), the first phase ($F_1$) dispersed as a dispersed phase can be made smaller, and when the first phase ($F_1$) is present as a continuous phase in the second phase ($F_2$), the thickness of the first phase ($F_1$) as a continuous phase can be made smaller. This makes it possible to reduce the amount of the polyamide resin to be used, which has a specific gravity larger than those of other components, to reduce the specific gravity of the present composition. This makes it possible to obtain a molded body that is excellent in both impact resistance and flexural modulus while being lightweight. Further, since the content of the polyamide resin can be reduced while such mechanical properties are sufficiently maintained, the molded body made of the present composition can have a low-gloss appearance with low surface luster. Therefore, the molded body can be applied also to exterior and interior materials that are directly visually recognized, and can offer excellent design flexibility.

When the total of the polyolefin resin and the polyamide resin in the present composition is taken as 100% by mass, the content of the polyamide resin may be 1.5% by mass or more but 88% by mass or less. The content of the polyamide resin is preferably 3% by mass or more but 75% by mass or less, more preferably 5% by mass or more but 70% by mass or less, even more preferably 10% by mass or more but 65% by mass or less, even more preferably 15% by mass or more but 60% by mass or less, even more preferably 18% by mass or more but 55% by mass or less, even more preferably 20% by mass or more but 50% by mass or less, even more preferably 25% by mass or more but 45% by mass or less.

That is, the content of the polyolefin resin may be 12% by mass or more but 98.5% by mass or less, but is preferably 25% by mass or more but 97% by mass or less, more preferably 30% by mass or more but 95% by mass or less, even more preferably 35% by mass or more but 90% by mass or less, even more preferably 40% by mass or more but 85% by mass or less, even more preferably 45% by mass or more but 82% by mass or less, even more preferably 50% by mass or more but 80% by mass or less, even more preferably 55% by mass or more but 75% by mass or less.

When the content of the polyamide resin is within the above range, a thermoplastic resin composition that is excellent in both impact resistance and flexural modulus and a molded body made of such a thermoplastic resin composition can be obtained.

When the total of the polyolefin resin, the polyamide resin, and the compatibilizer in the present composition is taken as 100% by mass, the content of the polyolefin resin may be 2% by mass or more but 90% by mass or less. The content of the polyolefin resin is preferably 5% by mass or more but 85% by mass or less, more preferably 10% by mass or more but 83% by mass or less, even more preferably 15% by mass or more but 80% by mass or less, even more preferably 20% by mass or more but 78% by mass or less, even more preferably 25% by mass or more but 75% by mass or less, even more preferably 30% by mass or more but 73% by mass or less, even more preferably 35% by mass or more but 70% by mass or less.

When the content of the polyolefin resin is within the above range, a thermoplastic resin composition that is excellent in both impact resistance and flexural modulus and a molded body made of such a thermoplastic resin composition can be obtained.

When the total of the polyolefin resin, the polyamide resin, and the compatibilizer in the present composition is taken as 100% by mass, the content of the polyamide resin may be 1% by mass or more but 75% by mass or less. The content of the polyamide resin is preferably 15% by mass or more but 72% by mass or less, more preferably 20% by mass or more but 70% by mass or less, even more preferably 22% by mass or more but 68% by mass or less, even more preferably 25% by mass or more but 65% by mass or less, even more preferably 27% by mass or more but 57% by mass or less, even more preferably 29% by mass or more but 53% by mass or less, even more preferably 33% by mass or more but 49% by mass or less.

When the content of the polyamide resin is within the above range, the branched phase ($F_{1B}$) is particularly easily formed, and therefore a thermoplastic resin composition that is excellent in both impact resistance and flexural modulus and a molded body made of such a thermoplastic resin composition can be obtained.

When the total of the polyolefin resin, the polyamide resin, and the compatibilizer in the present composition is taken as 100% by mass, the content of the compatibilizer may be 1% by mass or more but 60% by mass or less. The content of the compatibilizer is preferably 5% by mass or more but 53% by mass or less, more preferably 11% by mass or more but 45% by mass or less, even more preferably 12% by mass or more but 40% by mass or less, even more preferably 13% by mass or more but 38% by mass or less, even more preferably 14% by mass or more but 36% by mass or less, even more preferably 15% by mass or more but 35% by mass or less, even more preferably 18% by mass or more but 34% by mass or less.

When the content of the polyamide resin is within the above range, the branched phase ($F_{1B}$) is particularly easily formed, and therefore a thermoplastic resin composition that is excellent in both impact resistance and flexural modulus and a molded body made of such a thermoplastic resin composition can be obtained.

The present composition can achieve high impact resistance or high flexural modulus or can achieve both of these properties. More specifically, the present composition can have a Charpy impact strength of 5 kJ/m$^2$ or more but 150 kJ/m$^2$ or less. The present composition can have a flexural modulus of 430 MPa or more but 1500 MPa or less. Further, the present composition can have a Charpy impact strength of 50 kJ/m$^2$ or more but 140 kJ/m$^2$ or less. The present composition can have a flexural modulus of 440 MPa or more but 1300 MPa or less. Further, the present composition can have a Charpy impact strength of 60 kJ/m$^2$ or more but 135 kJ/m$^2$ or less. The present composition can have a flexural modulus of 450 MPa or more but 1250 MPa or less. Further, the present composition can have a Charpy impact strength of 70 kJ/m$^2$ or more but 130 kJ/m$^2$ or less. The present composition can have a flexural modulus of 460 MPa or more but 1200 MPa or less. Further, the present composition can have a Charpy impact strength of 80 kJ/m$^2$ or more but 125 KJ/m$^2$ or less. The present composition can have a flexural modulus of 470 MPa or more but 1100 MPa or less.

Particularly, when the ratio of the compatibilizer is 11% by mass or more but less than 18% by mass per 100% by mass of the total of the polyolefin resin, the polyamide resin, and the compatibilizer, the present composition can have a Charpy impact strength of 45 kJ/m$^2$ or more but 100 kJ/m$^2$ or less while maintaining a flexural modulus of 880 MPa or more but 1300 MPa or less.

Further, when the ratio of the compatibilizer is 18% by mass or more but less than 22% by mass, the present composition can have a Charpy impact strength of 65 kJ/m$^2$ or more but 120 kJ/m$^2$ or less while maintaining a flexural modulus of 800 MPa or more but 1200 MPa or less.

Further, when the ratio of the compatibilizer is 22% by mass or more but less than 27% by mass, the present composition can have a Charpy impact strength of 80 kJ/m$^2$ or more but 130 kJ/m$^2$ or less while maintaining a flexural modulus of 750 MPa or more but 1000 MPa or less.

Further, when the ratio of the compatibilizer is 27% by mass or more but 33% by mass or less, the present composition can have a Charpy impact strength of 95 kJ/m$^2$ or more but 130 kJ/m$^2$ or less while maintaining a flexural modulus of 500 MPa or more but 800 MPa or less.

[2] Molded Body

A molded body according to the present invention is made of the present composition. The present composition is as described above. The molded body may be a solid molded body or a foamed molded body. Among them, a solid molded body is preferred from the viewpoint of achieving excellent impact absorbability. The molded body may be obtained by any method, and a molding method to be used is not particularly limited. Examples of the molding method include injection molding, extrusion molding (sheet extrusion, profile extrusion), T-die molding, blow molding, injection blow molding, inflation molding, blow molding, vacuum molding, compression molding, press molding, stamping molding, and transfer molding. These olefins may be used singly or in combination of two or more of them.

The shape, size, thickness, etc. of the molded body are not particularly limited, and the intended use of the molded body is not particularly limited, either. This molded body can be used for, for example, exterior materials, interior materials, structural materials, and shock absorbers for automobiles, railway vehicles, ships, and airplanes. Examples of the molded body used for automobiles include exterior materials for automobiles, interior materials for automobiles, structural materials for automobiles, shock absorbers for automobiles, and parts in engine rooms. Specific examples thereof include bumpers, spoilers, cowlings, front grills, garnishes, hoods, trunk lids, fender panels, door panels, roof panels, instrument panels, center clusters, door trims, quarter trims, roof linings, pillar garnishes, deck trims, tonneau boards, package trays, dashboards, console boxes, kicking plates, switch bases, seat backboards, seat frames, armrests, sunvisors, intake manifolds, engine head covers, engine under covers, oil filter housings, housings of in-car electronic parts (e.g., ECUs and TV monitors), and air filter boxes.

Further, the molded body can be used for, for example, interior materials, exterior materials, and structural materials of buildings, furniture, and the like. Specific examples thereof include door covering materials, door structural materials, and covering materials and structural materials of various kinds of furniture (e.g., desks, chairs, shelves, and chests of drawers). Further, the molded body can also be used for packages, containers (e.g., trays), protecting members, and partition members. Further, the molded body can also be used for housings and structures of household appliances (e.g., flat-panel TVs, refrigerators, washing machines, vacuum cleaners, mobile phones, mobile game machines, and laptop personal computers).

[3] Method for Manufacturing Thermoplastic Resin Composition

A method for manufacturing a thermoplastic resin composition according to the present invention is a method for manufacturing the present composition, comprising:

a first melt-kneading step in which the polyamide resin and the compatibilizer are melt-kneaded so that a mixing ratio of the compatibilizer is 11% by mass or more but 45% by mass or less per 100% by mass of a total of the polyolefin resin, the polyamide resin, and the compatibilizer; and a second melt-kneading step in which a first composition obtained in the first melt-kneading step and the polyolefin resin are melt-kneaded.

Here, the properties of each of the polyolefin resin, the polyamide resin, and the compatibilizer, and mixing of them are as described above.

The first melt-kneading step is a step in which the polyamide resin and the compatibilizer are melt-kneaded.

In this step, any melt-kneading apparatus may be used. Examples of the melt-kneading apparatus to be used include an extruder (e.g., a single screw extruder or a twin screw extruder), a kneader, and a mixer (e.g., a high-speed flow mixer, a paddle mixer, or a ribbon mixer). These apparatuses may be used singly or in combination of two or more of them. When two or more of the apparatuses are used, they may be operated continuously or batch-wise. Further, all the raw materials may be mixed at a time or may be mixed by adding them in several batches (multistage addition).

The kneading temperature in the first melt-kneading step is not particularly limited, but is preferably 190° C. or more but 350° C. or less, more preferably 200° C. or more but 330° C. or less, even more preferably 205° C. or more but 310° C. or less.

Further, the second melt-kneading step is a step in which a first composition obtained in the first melt-kneading step and the polyolefin resin are melt-kneaded.

The first composition obtained by first melt-kneading may be a composition in a molten state or a composition in a softened state, or may be solidified by, for example, pelletization.

The second melt-kneading step may also be performed using any melt-kneading apparatus, and the various apparatuses exemplified above with reference to the first melt-kneading step may be used singly or in combination of two or more of them. Further, the apparatus used in the first melt-kneading step and the apparatus used in the second melt-kneading step may be the same or different from each other.

When two or more of the apparatuses are used, they may be operated continuously or batch-wise. Further, all the raw materials may be mixed at a time or may be mixed by adding them in several batches (multistage addition).

Further, the kneading temperature of second melt-kneading is preferably 190° C. or more but 350° C. or less, more preferably 200° C. or more but 300° C. or less, even more preferably 205° C. or more but 260° C. or less.

The manufacturing method includes the first melt-kneading step, and therefore kneading is performed when the polyamide resin and the compatibilizer are reacted. Therefore, it is considered that when the compatibilizer to be used has a reactive group, the reactive group is added to the surface of the polyamide resin so that polyamide resin particles having a reaction product of the compatibilizer bound to the surfaces thereof are formed. Then, the polyamide resin particles having a reaction product of the compatibilizer bound to the surfaces thereof are sheared by further kneading so that the unreacted surface of the polyamide resin appears. Then, the unreacted compatibilizer further reacts with this unreacted surface. It is considered that smaller polyamide resin particles having a reaction product of the compatibilizer bound thereto can be stably formed without applying a high shear by such a repetition of shearing of polyamide resin particles having a reaction product of the compatibilizer bound thereto, appearance of the unreacted surface of the polyamide resin, and the reaction of the unreacted compatibilizer with the unreacted surface.

Further, it is considered that when the amount of the compatibilizer to be supplied in the above process is small, it is difficult to make the polyamide resin particles having a reaction product of the compatibilizer bound thereto small, and when the amount of the compatibilizer to be supplied is sufficiently large, it is easy to make the polyamide resin particles having a reaction product of the compatibilizer bound thereto small.

EXAMPLES

Hereinbelow, the present invention will be specifically described with reference to examples.

[1] Preparation of Thermoplastic Resin Compositions and Preparation of Test Specimens Example 1

[1] Preparation of Thermoplastic Resin Compositions (1) Pellets of the following polyamide resin and pellets of the following compatibilizer were dry-blended, then fed into a twin-screw melt-kneading extruder (manufactured by Coperion, screw diameter: 50 mm, L/D=48), and melt-kneaded under conditions of a kneading temperature of 210° C., an extrusion speed of 150 kg/hr, and a screw rotation speed of 500 rpm. The thus obtained first composition was pelletized by a pelletizer to obtain pellets of the first composition.

Polyamide resin: Nylon 11 resin, manufactured by ARKEMA K.K., product name "Rilsan BMN O", weight-average molecular weight 18,000, melting point 190° C.

Compatibilizer: Maleic anhydride-modified ethylene-butene copolymer (modified EBR), manufactured by Mitsui Chemicals, Inc., product name "TAFMER MH7020", MFR (230° C.)=1.5 g/10 min (2) Preparation of Molded Body for Evaluation The pellets of the first composition obtained in the above (1) and pellets of the following polyolefin resin were dry-blended, then fed into a twin-screw melt-kneading extruder (manufactured by Coperion, screw diameter: 50 mm, L/D=48), and melt-kneaded under conditions of a kneading temperature of 210° C., an extrusion speed of 150 kg/hr, and a screw rotation speed of 500 rpm. The thus obtained thermoplastic resin composition was pelletized by a pelletizer to obtain pellets of the thermoplastic resin composition.

Second polyolefin resin: Polypropylene resin, homopolymer, manufactured by Japan Polypropylene Corporation, product name "NOVATEC MA1B", weight-average molecular weight 312,000, melting point 165° C.

(3) The pellets obtained in the above (2) were fed into an injection molding machine (manufactured by NISSEI PLASTIC INDUSTRIAL CO., LTD., 40-ton injection molding machine) and injection-molded under injection conditions of a set temperature of 210° C. and a mold temperature of 40° C. to obtain test specimens for measuring physical properties.

(4) According to the above procedure, each of thermoplastic resin compositions of Experimental Examples 1 to 33 was prepared by mixing the compatibilizer, the polyolefin resin, and the polyamide resin in a mixing ratio shown in the following Table 1 so that the total of them was 100% by mass, and test specimens for measuring physical properties made of the thus obtained thermoplastic resin compositions were obtained (see Table 1).

[2] Evaluations of Molded Bodies for Evaluation (1) Measurement of Charpy Impact Strength Measurement of Charpy impact strength was performed in accordance with JIS K7111-1 using each of the test specimens for evaluation of Experimental Examples 1 to 33 obtained in the above [1]. The results of the measurement are shown in Table 1. It is to be noted that in the measurement of Charpy impact strength, impact strength was measured at a temperature of 23° C. by an edgewise test method using a test specimen having a notch (type A). Further, the correlation between the mixing ratio of the polyamide resin and the Charpy impact strength when the mixing ratio of the compatibilizer was changed is shown in FIG. 6.

(2) Measurement of Flexural Modulus

Measurement of flexural modulus was performed in accordance with JIS K7171 using each of the test specimens for evaluation of Experimental Examples 1 to 33 obtained in the above [1]. The results of the measurement are shown in Table 1. It is to be noted that the measurement of flexural modulus was performed by applying a load at a speed of 2 mm/min from an action point (curvature radius: 5 mm) located at the middle of two supporting points (curvature radius: 5 mm) whose distance (L) was 64 mm while supporting each of the test specimens at the two supporting points. Further, the correlation between the flexural modulus and the Charpy impact strength when the mixing ratio of the compatibilizer was changed is shown in FIG. 7.

(3) Observation of Morphology

The fracture surface of each of the test specimens that had been subjected to the Charpy impact strength measurement in the above (1) was subjected to oxygen plasma etching treatment at 100 W for 1 minute and then to osmium coating treatment and observed with a field emission scanning electron microscope ("JSM-7100F TTL LV" manufactured by JEOL Ltd.) to obtain an image (FE-SEM image). Among these images, the image of Experimental Example 10 (compatibilizer:polyolefin resin:polyamide resin=15:45:40% by mass), the image of Experimental Example 25 (compatibilizer:polyolefin resin:polyamide resin=25:32.5:42.5% by mass), and the image of Experimental Example 14 (compatibilizer:polyolefin resin:polyamide resin=20:55:25% by mass) are shown in FIG. 3, FIG. 4, and FIG. 5, respectively.

It is to be noted that the component constituting each phase was identified by energy dispersive X-ray spectrometry (EDS) during the above FE-SEM observation.

Further, the presence or absence of the branched phase ($F_{1B}$) having a maximum length of 7 μm or more observed per 40 micrometers square in the image taken at 2000× or 5000× magnification is shown in Table 1.

More specifically, "Present" in the column indicating the presence or absence of the branched phase in Table 1 means that the branched phase ($F_{1B}$) satisfying the above requirement was present. On the other hand, "Absent" in the column indicating the presence or absence of the branched phase in Table 1 means that the branched phase ($F_{1B}$) satisfying the above requirement was not present.

It is to be noted that "Absent (spherical)" in the column means that only the spherical phase ($F_{1S}$) was observed and the branched phase ($F_{1B}$) was not present. Further, "Absent (co-continuous)" in the column means that only the co-continuous phase was observed and the branched phase ($F_{1B}$) was not present. Further, "Absent (phase inversion)" in the column means that phase inversion occurred so that the first phase ($F_1$) was composed of the polyolefin resin and the second phase ($F_2$) was composed of the polyamide resin.

Further, the longest diameter (major axis dispersion diameter) of each of 20 particles of the dispersed phase ($F_{12}$) randomly selected within each of five different regions in an image taken at 10000× magnification in the same manner as described above was measured, and the average of the measured longest diameters was determined as a first average value, and the average of the first average values of the five different regions was further determined as a major axis-average dispersion diameter.

As a result, the major axis-average dispersion diameter of the dispersed phase ($F_{12}$) in Experimental Example 10 was 196 nm, and the major axis-average dispersion diameter of the dispersed phase ($F_{12}$) in Experimental Example 25 was 204 nm.

TABLE 1-1

| | Experimental Example | | | | | | | | | | |
|---|---|---|---|---|---|---|---|---|---|---|---|
| | 1 | 2 | 3 | 4 | 5 | 6 | 7 | 8 | 9 | 10 | 11 |
| Compatibilizer (% by mass) | 10.0 | 10.0 | 10.0 | 10.0 | 10.0 | 10.0 | 10.0 | 10.0 | 15.0 | 15.0 | 15.0 |
| Polyolefin (% by mass) | 65.0 | 60.0 | 50.0 | 40.0 | 35.0 | 30.0 | 25.0 | 20.0 | 60.0 | 45.0 | 40.0 |
| Polyamide (% by mass) | 25.0 | 30.0 | 40.0 | 50.0 | 55.0 | 60.0 | 65.0 | 70.0 | 25.0 | 40.0 | 45.0 |
| Branched phase | Absent (spherical) | Absent (spherical) | — | — | — | Absent (co-continuous) | — | Absent (phase inversion) | Absent (spherical) | Present | — |
| Flexural modulus (MPa) | 1184 | 1182 | 1148 | 1062 | 1006 | 964 | 946 | 927 | 1030 | 1072 | 1110 |
| Charpy impact strength (kJ/m²) | 8.8 | 9.5 | 10.1 | 14.8 | 21.0 | 23.2 | 62.1 | 25.7 | 17.9 | 92.9 | 96.8 |

TABLE 1-2

| | Experimental Example | | | | | | | | | | |
|---|---|---|---|---|---|---|---|---|---|---|---|
| | 12 | 13 | 14 | 15 | 16 | 17 | 18 | 19 | 21 | 22 | 23 |
| Compatibilizer (% by mass) | 15.0 | 15.0 | 20.0 | 20.0 | 20.0 | 20.0 | 20.0 | 20.0 | 20.0 | 25.0 | 25.0 |
| Polyolefin (% by mass) | 35.0 | 30.0 | 55.0 | 40.0 | 30.0 | 25.0 | 22.5 | 21.0 | 17.5 | 45.0 | 37.5 |
| Polyamide (% by mass) | 50.0 | 55.0 | 25.0 | 40.0 | 50.0 | 55.0 | 57.5 | 59.0 | 62.5 | 30.0 | 37.5 |
| Branched phase | — | Present | Absent (spherical) | — | — | — | — | — | Absent (phase inversion) | Absent (spherical) | — |
| Flexural modulus (MPa) | 1113 | 952 | 845 | 949 | 949 | 885 | 865 | 850 | 830 | 714 | 735 |
| Charpy impact strength (kJ/m²) | 97.2 | 89.3 | 69.0 | 110.0 | 84.0 | 83.0 | 83.0 | 83.0 | 85.0 | 77.3 | 98.7 |

TABLE 1-3

| | Experimental Example | | | | | | | | | |
|---|---|---|---|---|---|---|---|---|---|---|
| | 24 | 25 | 26 | 27 | 28 | 29 | 30 | 31 | 32 | 33 |
| Compatibilizer (% by mass) | 25.0 | 25.0 | 25.0 | 30.0 | 30.0 | 30.0 | 30.0 | 30.0 | 30.0 | 30.0 |
| Polyolefin (% by mass) | 35.0 | 32.5 | 25.0 | 45.0 | 30.0 | 20.0 | 15.0 | 12.5 | 10.0 | 7.5 |
| Polyamide (% by mass) | 40.0 | 42.5 | 50.0 | 25.0 | 40.0 | 50.0 | 55.0 | 57.5 | 60.0 | 62.5 |
| Branched phase | — | Present | — | Absent (spherical) | — | — | — | — | — | — |

TABLE 1-3-continued

| | Experimental Example | | | | | | | | | |
|---|---|---|---|---|---|---|---|---|---|---|
| | 24 | 25 | 26 | 27 | 28 | 29 | 30 | 31 | 32 | 33 |
| Flexural modulus (MPa) | 763 | 779 | 784 | 527 | 634 | 665 | 579 | 565 | 535 | 532 |
| Charpy impact strength (kJ/m$^2$) | 107.0 | 120.0 | 105.4 | 83.0 | 120.0 | 94.0 | 92.0 | 92.0 | 88.0 | 86.0 |

[3] Effects of Examples

As can be seen from the results of Experimental Examples 1 to 33, as shown in FIG. 6, in the system in which the mixing ratio of the compatibilizer is, for example, 15% by mass (-◇-), the branched phase ($F_{1B}$) is observed in both the experimental examples where the mixing ratio of the polyamide resin is 40% by mass (Experimental Example 10) and the mixing ratio of the polyamide resin is 55% by mass (Experimental Example 13). Therefore, it can be considered that the branched phase ($F_{1B}$) is present when the mixing ratio of the polyamide resin is in the range of at least 40 to 55% by mass. Further, in this case, high impact strength is achieved over a wide range. Therefore, it can be said that the thermoplastic resin composition having a branched phase ($F_{1B}$) can exhibit excellent mechanical strength in spite of the fact that its composition can be selected from a wider range and raw material selection and manufacturing control can be performed more flexibly.

Further, as can be seen from FIG. 7 in which the correlation between Charpy impact strength and flexural modulus is plotted, in the system in which the mixing ratio of the compatibilizer is 10% by mass (-x-), a plotted range indicated by a dotted rectangle is horizontally wide, whereas in each of the systems in which the mixing ratio of the compatibilizer is 15 to 30% by mass, a plotted range is vertically-long rectangular. This reveals that in the system having the branched phase ($F_{1B}$), the Charpy impact strength can be widely changed while the flexural modulus is maintained within a narrow range.

The foregoing examples have been provided merely for the purpose of explanation and are in no way to be construed as limiting of the present invention. Although the present invention has been described with reference to exemplary embodiments, it is understood that the words which have been used in the description and drawings are words of explanation and illustration, rather than words of limitation. Changes may be made within the scope of the appended claims as described in detail herein without departing from the scope and spirit of the present invention in its aspects. Although the present invention has been described in detail with reference to particular structures, materials, and embodiments, the present invention is not intended to be limited to the particulars disclosed herein; rather, the present invention extends to all functionally-equivalent structures, methods, and uses within the scope of the appended claims.

REFERENCE SIGNS LIST $F_1$; First phase
$F_{1B}$; Branched phase
B, B1, B2, B3; Branch portion
$F_{1S}$; Spherical phase
$F_{11}$; Matrix phase
$F_{12}$; Dispersed phase
$F_2$; Second phase

The invention claimed is:

1. A thermoplastic resin composition that is obtained by mixing a polyolefin resin, a polyamide resin, and a compatibilizer, and
has a first phase ($F_1$) composed of the polyamide resin and the compatibilizer and/or a reaction product of the polyamide resin and the compatibilizer, and
a second phase ($F_2$) composed of the polyolefin resin and interposed between the first phase ($F_1$), wherein
the first phase ($F_1$) has a matrix phase ($F_{11}$) composed of the polyamide resin and a dispersed phase ($F_{12}$) dispersed in the matrix phase ($F_{11}$) and composed of the compatibilizer and/or a reaction product of the polyamide resin and the compatibilizer,
the first phase ($F_1$) is a dispersed phase dispersed in the second phase ($F_2$),
wherein some of the first phase ($F_1$) comprises a branched phase ($F_{1B}$) having branch portions, and the branched phase ($F_{1B}$) is a phase branched into two or more branches,
when a total of the polyolefin resin, the polyamide resin, and the compatibilizer is taken as 100% by mass, a mixing ratio of the polyolefin resin is 25% by mass or more but 45% by mass or less, a mixing ratio of the polyamide resin is 37.5% by mass or more but 55% by mass or less, and a mixing ratio of the compatibilizer is 13% by mass or more but 30% by mass or less, and
the compatibilizer is at least one of an acid-modified olefin-based elastomer and an acid-modified styrene-based elastomer.

2. The thermoplastic resin composition according to claim 1, which has a Charpy impact strength of 70 kJ/m$^2$ or more but 140 kJ/m$^2$ or less.

3. The thermoplastic resin composition according to claim 1, wherein when a total of the polyolefin resin, the polyamide resin, and the compatibilizer is taken as 100% by mass, a mixing ratio of the compatibilizer is 13% by mass or more but less than 27% by mass, and the flexural modulus is 750 MPa or more but 1300 MPa or less.

4. The thermoplastic resin composition according to claim 1, wherein the dispersed phase ($F_{12}$) in the first phase ($F_1$) has an average dispersion diameter of 500 nm or less.

5. A molded body comprising of the thermoplastic resin composition according to claim 1.

6. The thermoplastic resin composition according to claim 1, wherein the branched phase has a maximum length of 7 μm or more.

7. The thermoplastic resin composition according to claim 1, wherein the branched phase has a branch portion having a maximum length of 3 μm or more.

8. A thermoplastic resin composition that is obtained by mixing a polyolefin resin, a polyamide resin, and a compatibilizer, and
has a first phase ($F_1$) composed of the polyamide resin and the compatibilizer and/or a reaction product of the polyamide resin and the compatibilizer, and a second phase ($F_2$) composed of the polyolefin resin and interposed between the first phase ($F_1$), wherein the first phase ($F_1$) has a matrix phase ($F_{11}$) composed of the polyamide resin and a dispersed phase ($F_{12}$) dispersed in the matrix phase ($F_{11}$) and composed of the compatibilizer and/or a reaction product of the polyamide resin and the compatibilizer, the first phase ($F_1$) is a dispersed phase dispersed in the second phase ($F_2$), wherein all of the first phase ($F_1$) comprise branched phases ($F_{1B}$) having branch portions, and the branched phase ($F_{1B}$) is a phase branched into two or more branches, when a total of the polyolefin resin, the polyamide resin, and the compatibilizer is taken as 100% by mass, a mixing ratio of the polyolefin resin is 25% by mass or more but 45% by mass or less, a mixing ratio of the polyamide resin is 37.5% by mass or more but 55% by mass or less, and a mixing ratio of the compatibilizer is 13% by mass or more but 30% by mass or less, and the compatibilizer is at least one of an acid-modified olefin-based elastomer and an acid-modified styrene-based elastomer.

* * * * *